(12) United States Patent
Lin et al.

(10) Patent No.: US 6,944,226 B1
(45) Date of Patent: Sep. 13, 2005

(54) SYSTEM AND ASSOCIATED METHOD FOR TRANSCODING DISCRETE COSINE TRANSFORM CODED SIGNALS

(75) Inventors: Wanrong Lin, Plainsboro, NJ (US); Dennis Bushmitch, Somerset, NJ (US); David Alan Braun, Denville, NJ (US); Raghuraman Mudumbai, Brooklyn, NY (US); Yao Wang, Matawan, NJ (US)

(73) Assignee: Matsushita Electric Corporation of America, Secaucus, NJ (US)

(*) Notice: Subject to any disclaimer, the term of this patent is extended or adjusted under 35 U.S.C. 154(b) by 763 days.

(21) Appl. No.: 09/677,901

(22) Filed: Oct. 3, 2000

(51) Int. Cl.[7] .................................................. H04N 7/12
(52) U.S. Cl. ....................... 375/240.2; 348/441; 386/40; 375/240.25
(58) Field of Search ............................ 375/240, 240.01, 375/240.03, 240.2, 240.25, 245, 240.26; 348/441; 386/40; 382/232; 370/498

(56) References Cited

U.S. PATENT DOCUMENTS

| | | | | |
|---|---|---|---|---|
| 5,550,640 A | * | 8/1996 | Tsuboi et al. ................. | 386/35 |
| 5,940,130 A | * | 8/1999 | Nilsson et al. ......... | 375/240.12 |
| 5,990,976 A | | 11/1999 | Higashida | |
| 6,005,678 A | | 12/1999 | Higashida et al. | |
| 6,141,447 A | * | 10/2000 | Linzer et al. ................ | 382/236 |
| 6,219,457 B1 | * | 4/2001 | Potu ............................. | 382/246 |
| 6,483,876 B1 | * | 11/2002 | Chang et al. .......... | 375/240.16 |
| 6,507,673 B1 | * | 1/2003 | Wang et al. ................. | 382/236 |
| 6,618,442 B1 | * | 9/2003 | Chen et al. .............. | 375/240.2 |

FOREIGN PATENT DOCUMENTS

| | | |
|---|---|---|
| EP | 0 951 184 A | 10/1999 |
| WO | WO 00 51357 A | 8/2000 |

OTHER PUBLICATIONS

F. Fell–Bosenbeck; "DV–Kompressin Grundlagen Und Anwendungen"; Fernseh Und Kinotechnik, Vde Verlag Gbmh.; Berlin, Germany; vol. 53, No. 6; Jun. 1999; pp. 336–34, 342–345.

P.H.N. De With and A.M.A. Rijckaert; "Design Considerations of the Video Compression System of the New DV Camcorder Standard"; IEEE Transaction on Consumer Electronics, vol. 43, No. 4, Nov. 1997; pp. 1160–1179.

* cited by examiner

*Primary Examiner*—Chris Kelley
*Assistant Examiner*—Erick Rekstad
(74) *Attorney, Agent, or Firm*—RatnerPrestia (57) ABSTRACT

A method is provided for transcoding between video signals in two standards, DV and MPEG-2, each standard including discrete cosine transform (DCT) compressed signals. The each of the signals have macroblocks containing a plurality of DCT blocks. The DCT blocks are quantized according to respective quantization methods defined by the standards. The coefficients in each block are zigzag scanned, run-length coded and variable-length coded. The process variable-length decodes the coefficients and translates the quantized coefficients in the DV standard into quantized coefficients in the MPEG standard without fully dequantizing at least some of the DV coefficients and without performing an inverse DCT operation on any of the DCT coefficients. DV blocks that are encoded in a 248 format are translated into an 88 format before they are converted to MPEG-2 blocks. A method for transcoding from MPEG-2 to DV is also described. The MPEG-2 signals are intra-frame encoded, have a 4:2:2 chrominance format and an 88 frame-encoded block format. According to this method, converted 88 DV blocks that represent significant intra-field motion are converted from the 88 format to a 248 format. The method also controls which overflow coefficients in the DV signal are transcoded into corresponding coefficients in the MPEG-2 signal to control the data rate of the MPEG-2 signal.

15 Claims, 8 Drawing Sheets

FIG. 4A 4 8x8 Y BLOCKS    2 8x8 Cb BLOCKs    2 8x8 Cr BLOCKS

SYSTEM AND ASSOCIATED METHOD FOR TRANSCODING DISCRETE COSINE TRANSFORM CODED SIGNALS

BACKGROUND OF THE INVENTION

The invention relates to a method for translating or "transcoding" between formats of compressed digital signals that have been encoded using a discrete cosine transform (DCT) operation. More particularly, the invention relates to a method of transcoding between a DV compressed signal and an MPEG compressed signal without performing an inverse discrete cosine transform (IDCT) operation.

The Moving Picture Experts Group (MPEG) video compression standard is one of the most popular formats in digital video production for compressing or encoding a video signal. The MPEG-2 standard was initially proposed and developed as an open standard by the international standard organization (ISO), its main strength is its flexibility and compression efficiency. The MPEG-2 standard is well suited for data transmission and storage. This standard was designed to allow video signals in many different formats to be compressed. It was also designed for broadcasting applications with a point to multi-point model in mind. As such, the MPEG-2 encoding-decoding process is highly asymmetric, the MPEG-2 encoder, for example, being far more complex than its corresponding decoder.

The MPEG-2 video compression method is also lossy, that is to say, significant information is lost when the signal is compressed. The standard is designed, however, to take advantage of the human visual system in order to hide these losses. Nonetheless, significant degradation of the video image occurs if a compressed signal is expanded, re-compressed and expanded again.

Consequently, MPEG based compression is not well suited for production and/or editing applications. In a production/editing environment there would be as many encoding steps as decoding steps, and the processing involved for simple tasks (e.g. frame-level editing) would be unwieldy as a complex encoding process would be required after each edit.

Because of these features of MPEG, a second standard Digital Video(DV) was developed as a proposed SMPTE standard. This standard includes Digital Video at 50 Mb/s (DV50) and Digital Video at 25 Mb/s (DV25). The DV standard is typically utilized to compress data for production/editing applications. The compression methods defined by the DV standard were designed with a studio production scenario in mind, so encoder and decoder are of roughly similar complexity. The DV standard uses fixed size frames and does not place as much emphasis on compression efficiency as does MPEG-2.

More detailed features of the DV standard are briefly reviewed hereafter for the purpose of facilitating the teachings of the present invention.

DV

Digital video DV50 has a constant bit-rate of 50 Mb/s, and a compression ratio of about 3.3:1. The chrominance format is 4:2:2, and the compression method is based on the DCT operation. All the frames of a DV50 signal are compressed independently from each other (i.e., intra-coded) into a fixed size payload. Both NTSC and PAL formats are supported by the DV50 standard.

Figure 1:
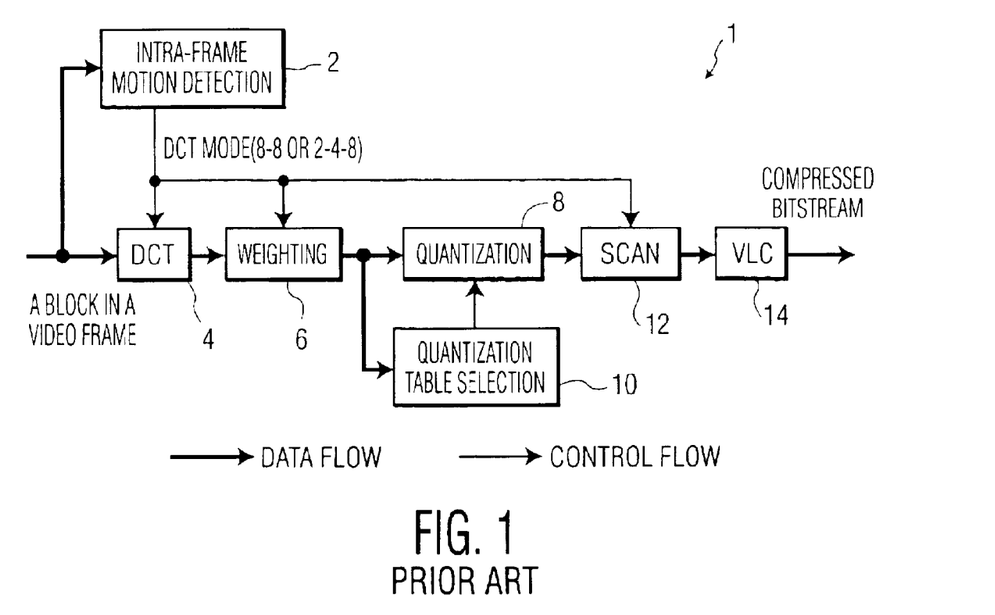
FIG. 1 is a control flow diagram of a DV encoding process.
Figure 1A:
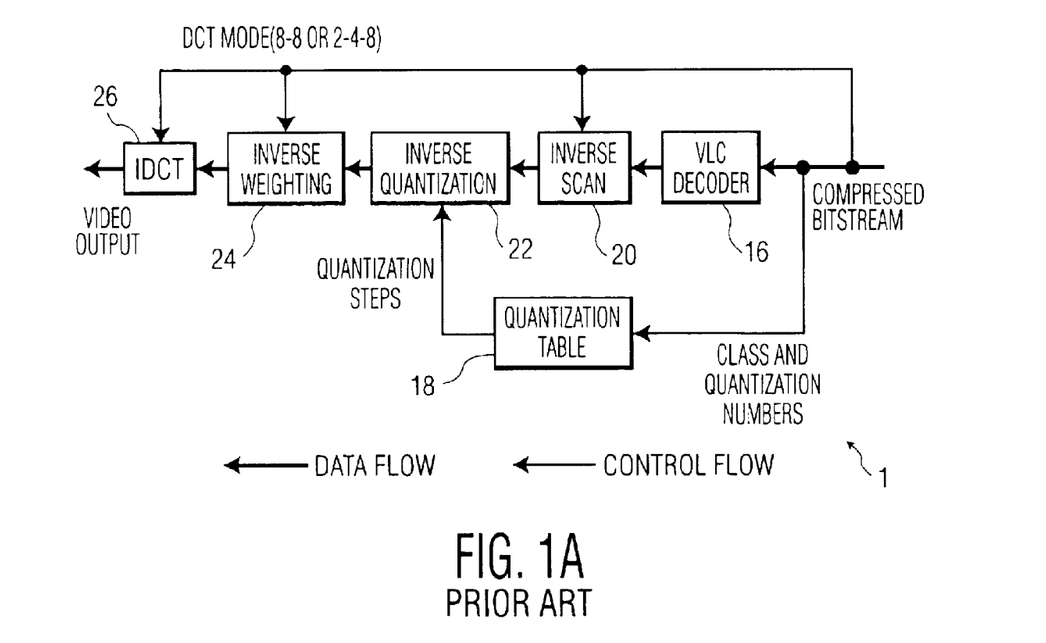
FIG. 1A is a is a control flow diagram of a DV decoding process.

FIGS. 1 and 1A illustrate an exemplary DV coding process, generally designated 1. Note that the DV standard only uses intra-frame coding, taking advantage of spatial redundancy in the image by transforming blocks of image pixels into the spatial frequency domain through the use of the DCT. The DV standard does not use any temporal prediction. In this regard, it is similar to the MPEG-2 standard constrained to encode only Intra-frame or I pictures.

The DV encoding process at the block level, however, encodes parts of frames that exhibit relatively large amounts of intra-frame motion differently than parts that do not exhibit this type of motion. Portions of frames that have significant motion between their fields are encoded as two 4×8 blocks, one from each field (248 blocks) while portions of frames that do not significant exhibit inter-field motion are encoded as 8×8 blocks (88 blocks). The relationship between the field encoded 248 blocks and the frame encoded 88 blocks is described below with reference to FIG. 2. In order to detect blocks that need to be encoded as 248 blocks, the DV coding process includes a intra-frame motion detector 2. This detector controls the DCT stage 4, weighting stage 6, and scan stage 12.

In operation, the intra-frame motion detector 2 monitors the fields of interlaced frames to detect rapid motion between the two fields that constitute the frame. A block of image pixels from the frame is applied to a discrete cosine transform (DCT) process 4 which converts the pixels to DCT coefficients. The weighting block 6 applies weighting factors to the DCT coefficients as a part of the quantization process, as described below. The weighted coefficients are applied in parallel to a quantization process 8 and to a quantization table selection block 10. Based on the values of the coefficients, the quantization table selection block 10 selects a quantization table to be used by the quantization process 8. The identity of this table is encoded into the bit-stream. Using this table, the process 8 quantizes the weighted coefficients provided by the weighting process 6 and applies the result to the scan stage 12. The scan stage 12 scans the coefficients to determine their run-amplitude combinations. Finally, the blocks of run-length coded coefficients are applied to a variable-length coder VLC) 14 in which they are encoded according to a predetermined variable length, or entropy, code to produce the output bit-stream The decoding process consists of a VLC decoder 16 that reverses the process performed by the VLC coder 14, a run-length decoder 20 that reverses the run-length scan performed by the scanner 12, and an inverse quantizer 22 that reverses the quantization operation performed by the quantizer 8. In order to dequantize the coefficients, the decoder identifies the quantization table that was used by the quantizer 8 and selects this table in the quantization table selection process 18. After the DV data has been dequantized, the weighting applied by the process 6 is reversed in the inverse weighting process 24 to reproduce the DCT coefficients generated by process 4 and these coefficients are applied to an inverse discrete cosine transform (IDCT) process 26. The decoder shown in FIG. 1B detects whether a block is encoded as an 88 block or as a 248 block and changes the operation of the inverse scan process 20, inverse weighting process 24 and IDCT process 26 accordingly. The quantization and inverse quantization operations are described in more detail below with reference to Tables 1, 2 and 3.

As set forth above, although the DV standard does not employ any inter-frame motion compensation scheme per se, it does have a facility for handling fast motion. If there is fast motion in the content, there may be perceptible differences between the two fields of an interlaced frame and thus, "intra-frame motion." In such a case, there may be only slight correlation between the two fields in the frame, so a frame-based compression method, such as an 88 DCT, may produce unsatisfactory results. When inter-field or intra-frame motion is detected by intra-frame detector 2, a different DCT mode called "248-DCT" is used to improve the coding efficiency. In this way, 248 DCT mode is used adaptively to suppress any degradation of picture quality in video images having fast motion content.

The quantization operation according to the DV standard is a multi-step C2 operation. After the coefficients have been processed through the discrete cosine transform, the DCT coefficients are scaled in weighting stage 6 (shown in FIG. 1). Weighting stage 6 utilizes a weighting matrix, that is chosen based on the DCT mode (88 DCT or 248 DCT).

Figure 3:
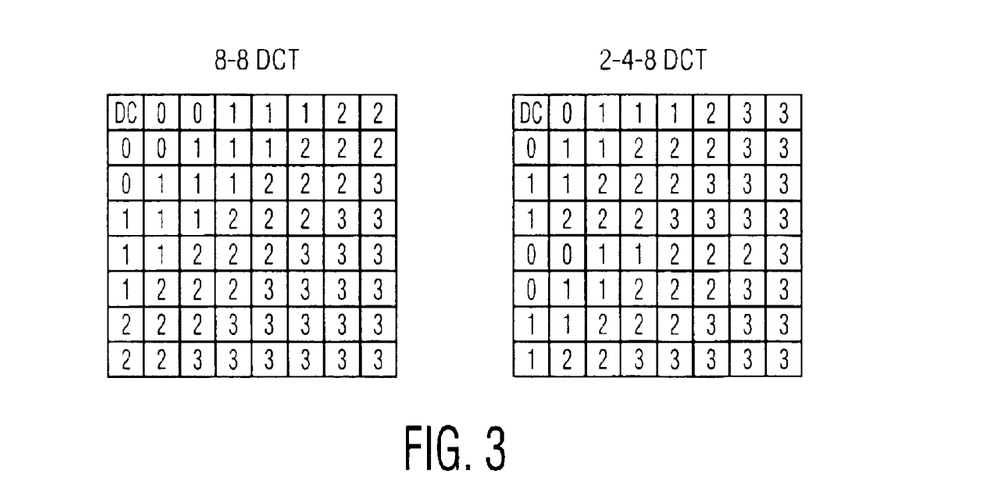
FIG. 3 is a DCT block pattern diagram showing area numbers for a 248 DCT block and an 88 DCT block.

Specifically, instead of giving the quantization step size explicitly for each coefficient, each DCT block is divided into 4 areas according to a predetermined pattern (shown in FIG. 3). This pattern is different for the 88-DCT and the 248-DCT. The quantization step size is the same in each defined area. Table 1 shows the quantization step size for each area, for different classes and quantization table numbers. For example, for a coefficient in area "2", if the class number is "1" and quantization table number is "10", the quantization step size is determined as follows. In Table 1, quantization number "10" is located in the column corresponding to class "1" and the row in which "10" resides is denoted as "row X". Next the column corresponding to area "2" is identified and denoted as "column Y". The quantization step size (in this case "2") to be used for the coefficient is found at the junction of row X and column Y.

TABLE 1

|  | Class Number | | | | Area Number | | | |
|---|---|---|---|---|---|---|---|---|
|  | 0 | 1 | 2 | 3 | 0 | 1 | 2 | 3 |
| Quantization Number | 15 |  |  |  | 1 | 1 | 1 | 1 |
|  | 14 |  |  |  | 1 | 1 | 1 | 1 |
|  | 13 |  |  |  | 1 | 1 | 1 | 1 |
|  | 12 | 15 |  |  | 1 | 1 | 1 | 1 |
|  | 11 | 14 |  |  | 1 | 1 | 1 | 1 |
|  | 10 | 13 |  | 15 | 1 | 1 | 1 | 1 |
|  | 9 | 12 | 15 | 14 | 1 | 1 | 1 | 1 |
|  | 8 | 11 | 14 | 13 | 1 | 1 | 1 | 2 |
|  | 7 | 10 | 13 | 12 | 1 | 1 | 2 | 2 |
|  | 6 | 9 | 12 | 11 | 1 | 1 | 2 | 2 |
|  | 5 | 8 | 11 | 10 | 1 | 2 | 2 | 4 |
|  | 4 | 7 | 10 | 9 | 1 | 2 | 2 | 4 |
|  | 3 | 6 | 9 | 8 | 2 | 2 | 4 | 4 |
|  | 2 | 5 | 8 | 7 | 2 | 2 | 4 | 4 |
|  | 1 | 4 | 7 | 6 | 2 | 4 | 4 | 8 |
|  | 0 | 3 | 6 | 5 | 2 | 4 | 4 | 8 |
|  |  | 2 | 5 | 4 | 4 | 4 | 8 | 8 |
|  |  | 1 | 4 | 3 | 4 | 4 | 8 | 8 |
|  |  | 0 | 3 | 2 | 4 | 8 | 8 | 16 |
|  |  |  | 2 | 1 | 4 | 8 | 8 | 16 |
|  |  |  | 1 | 0 | 8 | 8 | 16 | 16 |
|  |  |  | 0 |  | 8 | 8 | 16 | 16 |

A minor variation is applied to class 3 in the process described above. If a Class Number of 3 is chosen for a DCT block, then an extra right shifting by 1 bit-position is performed for each coefficient after the weighting step. The reason for this shift is in the VLC coding stage following the quantization stage, no AC coefficient greater than 255 or less than –255 is allowed and the quantization process for class 3 must ensure that the quantized AC coefficients will fall into that scope. For those DCT blocks that can not meet the VLC coding requirement with other class numbers, class 3 is the only choice.

Within a DCT block, the coefficient scan order is the same as in MPEG-2 for 88 DCT blocks but follows a different scan order for 248 DCT blocks. How the class number and quantization number chosen are matters of encoder design choice. But the DV standard gives some guidelines for class selection, which are shown in Tables 2 and 3.

TABLE 2

Class Number Selection and Quantization Noises

| Class Number | Quantization Noise | Maximum Absolute Value of AC Coefficient |
|---|---|---|
| 0 | Visible | Less than or equal to 255 |
| 1 | Lower than class 0 |  |
| 2 | Lower than class 1 |  |
| 3 | Lower than class 2 |  |
| — |  | Greater than 255 |

TABLE 3

An Example of the Classification for Reference

|  | Maximum Absolute Value of AC Coefficient | | | |
|---|---|---|---|---|
|  | 0 to 11 | 12 to 23 | 24 to 35 | >35 |
| Y | 0 | 1 | 2 | 3 |
| Cr | 1 | 2 | 3 | 3 |
| Cb | 2 | 3 | 3 | 3 |

Figure 4:
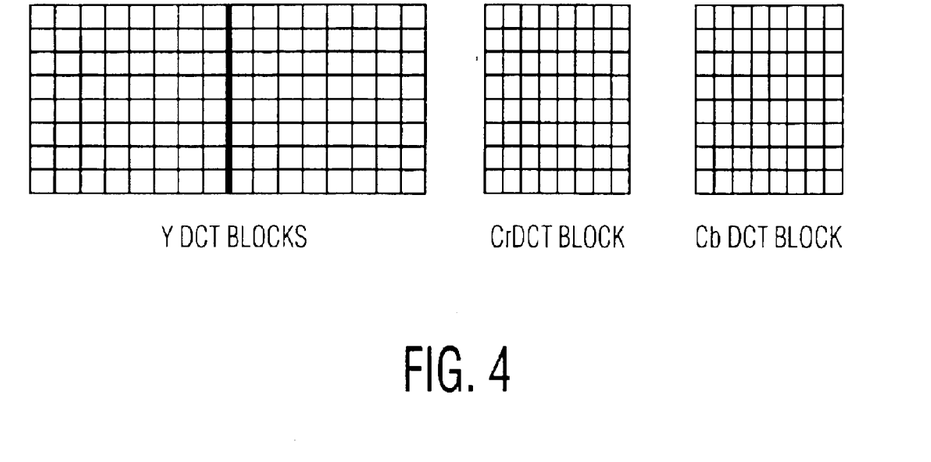
FIG. 4 is DCT block pattern diagram showing a macroblock structure for a 4:2:2 DV frame.
Figure 4A:
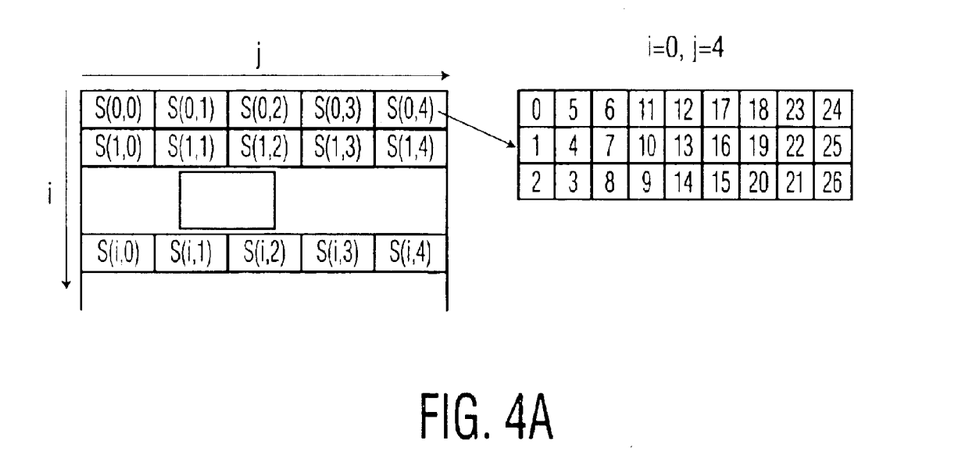
FIG. 4A is data structure diagram illustrating a super block structure for a 4:2:2 DV frame.

A macroblock in DV consists of 4 DCT blocks, including 2 luminance (Y) blocks, and two chrominance blocks (Cr and Cb), as shown in FIG. 4. Macroblocks are further organized into superblocks, each of which consists of 27 macroblocks as shown in FIG. 4A. FIG. 4A also shows the way in which the superblocks are formatted into image frames. The image frame shown in FIG. 4A is encoded by pseudo-randomly selecting five macroblocks, from five superblocks and grouping the selected macroblocks into a video segment. This pseudo-random selection is also known as shuffling. The blocks are shuffled to minimize distortion in the final image caused by burst errors in the data stream.

Each video segment is then compressed into 77×5 bytes, which is exactly the payload of five DIF (Digital Interface) packets. If a video segment is denoted as Seg(i,k), then the order of compressed segments in a frame is: Seg(0,0), Seg(0,1) . . . Seg(0,26), Seg(1,0) . . . Seg(n−1,26).

MPEG-2

The process of encoding an I-frame according to the MPEG-2 standard is similar in some ways and different in some ways from the process used according to the DV standard. In MPEG-2, 8 by 8 blocks of image pixels are processed using a discrete cosine transform (DCT) operation to produce 8 by 8 blocks of DCT coefficients. The coefficients are quantized, zigzag scanned, run-length coded and variable length coded to produce the output bit-stream. The blocks of DCT coefficients are arranged in macroblocks, each macroblock including eight 8 by 8 blocks. The macroblocks, in turn, are arranged in slices, where multiple slices constitute a picture. There are two variables in the quantization of a block of DCT coefficients, the quantization matrix and the quantizer scale value. The quantization matrix is transmitted with the bit-stream and may change for each picture. The quantization matrix defines the relative quantization resolution among the DC and lower spatial-frequency coefficients versus the higher spatial-frequency components of the DCT coefficients.

The quantizer scale value may be specified both in the slice header and in the macroblock header and, so, may change on a macroblock by macroblock basis. The quantizer scale value is a multiplier that multiplies the values in the quantization matrix. A larger value for the quantizer scale translates to a coarser quantization. The MPEG-2 encoder adjusts the quantizer scale value dynamically to adjust the data rate of the bit-stream. If this instantaneous data rate increases above a first threshold value, the encoder increases the quantizer scale value to more coarsely quantize the DCT coefficients and, so, reduce the data rate. It the data rate decreases below a second threshold value, the quantizer decreases the quantizer scale value to more finely quantize the DCT coefficients.

Because both MPEG-2 and DV provide characteristic advantages, it is conceivable that both standards will co-exist in the long term and complement each other in the studio environment. As can be appreciated from the above description, the DV and MPEG-2 standards were independently developed with no consideration as to their interoperability. Presently, there exist proprietary hardware systems for transcoding between the two formats. Yet, these systems are expensive and complex as they fully decode signals from one standard to the pixel level and then re-encode the data in the other standard.

Accordingly, there is a need for a simplified transcoding method for efficiently remedying this interoperability problem in real time.

SUMMARY OF THE INVENTION

The present invention is embodied in a method of transcoding between first and second standards that employ a discrete cosine transform (DCT) operation to compress video data. The method decodes a first signal that has been compressed according to a first standard to the level of the DCT coefficients and then re-encodes the coefficients to produce a compressed signal according to the second standard.

According to one aspect of the invention, the first standard encodes video frames differently when there is significant motion between the fields that constitute a frame than when there is no such motion. According to one embodiment of the invention, encoded frames of the first signal which have intra-frame motion are converted into a coding format used for frames that do not exhibit intra-frame motion before being converted to the second standard.

According to another aspect of the invention, the first standard is DV and frames in the DV encoded signal that have been encoded as 248 blocks are translated to 88 blocks after the DV signal is partially decoded.

According to another aspect of the invention, the method decodes the first signal into a stream of DCT blocks in which the coefficients are quantized according to the first standard. Quantized DCT coefficients in the first standard are converted to Quantized DCT coefficients in the second standard without being dequantized and then formatted into a compressed signal according to the second standard.

According to yet another aspect of the invention, the first standard is the DV standard and the second standard is the MPEG-2 standard. To partially decode the DV signal, the variable length coding (VLC) of the coefficients is reversed to obtain a sequence of blocks of quantized DCT coefficients. The quantized DCT coefficients in the DV standard are converted into quantized MPEG-2 macroblocks of coefficients without affecting the run-length coding of the coefficients. The quantized MPEG coefficients are then formatted into an MPEG-2 sequence of video frames and variable-length coded according to the MPEG-2 standard.

According to another aspect of the invention, the first standard is the DV standard and the second standard is the MPEG-2 standard. The DV standard encodes the image data into fixed-size blocks, macroblocks and segments. The macroblocks and segments include respective overflow data representing coefficients in individual blocks that do not fit within the fixed-size blocks. To reduce the data rate of the MPEG signal, the overflow data first in the segments and then in the macroblocks is selectively ignored. That is to say, the coefficient values corresponding to this overflow data may be set to zero.

According to yet another aspect of the invention, the first standard is the MPEG-2 standard and the second standard is the DV standard.

According to another aspect of the invention, MPEG-2 blocks are converted to DV frame-mode blocks and the DV frame mode blocks are analyzed to determine if they are to be converted to DV field-mode blocks. Responsive to the analysis, selected ones of the DV frame mode blocks are converted to DV field mode blocks.

According to yet another aspect of the invention, the analysis to determine whether a frame mode DV block is to be converted to a field mode DV block compares one coefficient of the frame mode DV block to a predetermined threshold value.

BRIEF DESCRIPTION OF THE SEVERAL VIEWS OF THE DRAWINGS

The foregoing summary as well as the following detailed description of exemplary embodiments of the invention, will be better understood when read in conjunction with the appended drawings. For the purpose of illustrating the invention, there is shown in the drawings several exemplary embodiments of the invention. It should be understood, however, that the invention is not limited to the precise arrangements and instrumentalities shown. In the drawings.

DETAILED DESCRIPTION OF THE INVENTION

Certain terminology is used herein for convenience only and is not to be taken as a limitation on the present invention.

The terms "intra-coded" and "intra-frame coded" are defined as referring to a coding scheme that does not employ temporal prediction in encoding a signal (i.e., all of the video frames are compressed independently of each other). In the drawings, the same reference numerals are used for designating the same elements throughout the several Figures.

The present invention concerns a transcoding system that translates between coding formats based primarily on the same linear orthogonal transform known as the Discrete Cosine Transform (DCT). The transcoder in accordance with C the present invention utilizes this commonality by recovering and re-quantizing these common DCT coefficients for transcoding into a desired format. In this way, it is not necessary to completely decode the signal to recover the original pixel data.)

Exemplary video formats supported by the transcoder of the present invention are Digital Video (DV) and MPEG-2 4:2:2 Profiled@ Main Level (4:2:2@ML) with I-frames only. Details of the DV may be found in a proposed SMPTE standard entitled "Data Structure for DV Based Audio, Data and Compressed Video, 25 Mb/s and 50 Mb/s," $4^{th}$ draft. Details on the MPEG-2 standards can be found in an ISO standard entitled "ISO/IEC 13818-2 Information Technology-Generic Coding of Moving Pictures and Associated Audio Information:Video."

Differences Between Intra-Frame (MPEG-2 4:2:2) and DV

As described above, intra-coded DV is a digital video recording standard mainly designed for field news acquisition and postproduction for television broadcast. MPEG-2 is a very flexible and "generic" video format that is designed for distributing compressed video data to consumers. To ensure that the implementation is efficient and that the editing features are supported, the exemplary embodiments use only I-frame based coding in the MPEG format.

Three different chrominance formats are supported by MPEG-2, the 4:2:0, 4:2:2 and 4:4:4 formats. The most commonly used MPEG-2 format is called Main Profile@Main Level, which is targeted for video in the CCIR-601 Resolution, in the 4:2:0 format. To meet the needs of the professional studio and post-production environment with interoperability, however, a new profile—4:2:2 Profile@Main Level—has been defined. Unlike other profiles defined in MPEG, this format is a non-scalable profile and does not have a hierarchical relationship with other profiles. The 4:2:2 Profile@Main level professional extension is used in the exemplary embodiment of the invention to match the chrominance format and bit-rate of signals encoded according to the DV standard.

Figure 5:
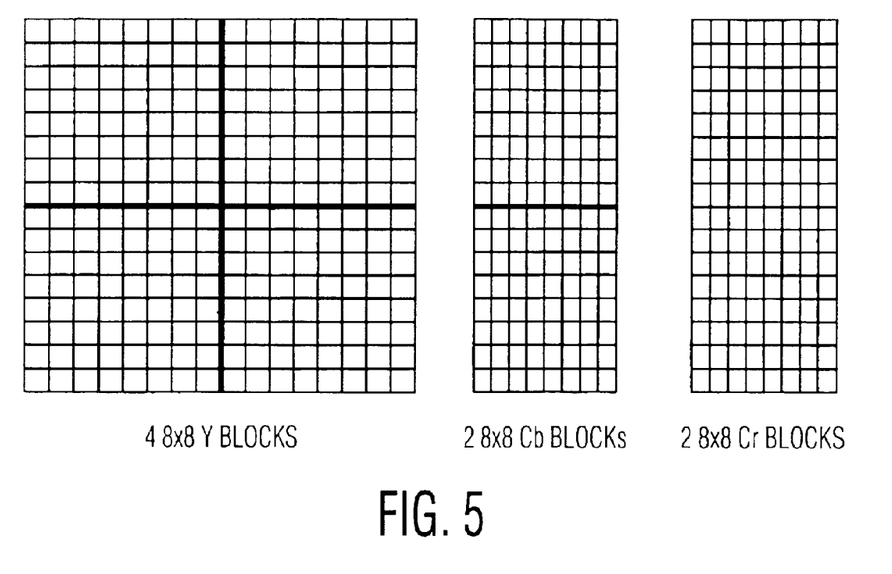
FIG. 5 is data structure diagram showing an MPEG-2 4:2:2 macroblock structure.

A macroblock in MPEG-2 consists of 4 Y-blocks and 2 Cb and 2 Cr blocks as illustrated in FIG. 5. The MPEG-2 standard was developed primarily for dealing with interlaced video. The pixels in pictures of interlaced video are sampled at alternate vertical positions in the image plane. The purpose of interlaced video is to trade-off vertical resolution for increased temporal resolution under a given total data rate constraint. As a result, both spatial and temporal correlation between the pixels in adjacent lines of interlaced frames is reduced, which causes a decrease in coding efficiency.

Without special treatment for interlaced video, two adjacent fields can be combined into one frame picture and coded as a progressive frame. Alternatively, one each of the two field pictures may be encoded as if it were a progressive frame. Special coding modes are designed in MPEG-2 to improve the coding efficiency for interlaced video. These include Field Prediction, Field DCT and Alternate Scan (a modification of the zigzag scan order). The transcoder of the present invention does not take advantage of these options. That is, the exemplary transcoder only implements frame-mode operations in MPEG-2 when transcoding DV video to MPEG-2. Conversely, when transcoding from MPEG-2 to DV, the exemplary transcoder processes only frame-mode encoded MPEG-2 images. Thus, as described below, the partial DV decoder used in the exemplary embodiment of the invention translates any 248 DCT blocks into corresponding 88 DCT blocks. The partial DV encoder described below examines each 88 DCT block provided by the partial MPEG-2 decoder and translates appropriate blocks to 248 DCT blocks for the DV signal.

As described above, quantization process in MPEG-2 differs considerably from the DV standard. Under the MPEG-2 standard, the quantization steps for all DCT coefficients constitute an 88 matrix denoted as quantization step matrix. It is computed as follows:

$$QS = QW \times Q\_Scale / 16$$

where QS=Quantization Step Matrix (8×8); QW=Quanization Weighting Matrix(8×8) and Q_Scale= Quantization Scale (an integer). QW can change on a picture-by-picture basis while Q_Scale can change on a macroblock-by-macroblock basis. As set forth above, QW is changed to take advantage of the frame content while Q_Scale is changed dynamically to increase or reduce the data rate of the compressed video signal. In 4:2:2 or 4:4:4 video streams, the QWs for luminance and chrominance blocks are different so there are four QWs all together.

(1) In DV, for each DCT block, a fixed number of bytes are assigned to the DCT encoded data. One macroblock consists of 4 DCT blocks, two luminance component blocks and two chrominance component blocks (one Cr and one Cb). A fixed number of bytes are also assigned to each macroblock (slightly more than the sum of the bytes assigned to its individual four DCT blocks). Every five macroblocks selected according to the predefined shuffling algorithm constitute a video segment, and a fixed number of bytes are assigned to each segment. If some DCT blocks need more storage space than that assigned to them, there are two steps to distribute "overflow" data bits:

a) Concatenate the overflowed bits of the DCT blocks within the same macroblock and distribute the bits to the unused space of the other DCT blocks in the same macroblock.

b) If, after step (a), there are still overflow bits for some macroblocks in a segment, then concatenate those overflow bits and distribute them to unused space of the DCT blocks in the same segment.

Because a fixed number of bytes is assigned to each block, the DC coefficient and the lower-spatial frequency coefficients are always stored in the area allocated to the block. Only the highest spatial frequency components are concatenated into the overflow data. Consequently, if an image is decoded without recovering the overflow data, only information related to these coefficients is lost. This scheme minimizes apparent distortion because the human eye is less sensitive to errors in the high spatial frequency components than to errors in the DC component or in the lower spatial frequency components.

Because the overflow data stays within the segment, each segment is completely independent from other segments. From the description above it follows that during the encoding of a DCT block and a macroblock, the unused bits should be preserved for future use by other DCT blocks in the same macroblock or the same segment.

Note that MPEG-2 needs no such facility for 'overflow', because, it does not have fixed size frames. Each MPEG-2 DCT block can be as big or small as necessary. This is also a tradeoff between compression efficiency and the convenience of fixed size frames.

(2) As described above, DV adopts a DCT mode called 248 DCT to encode frames that exhibit intra-frame motion. MPEG-2 also supports a frame DCT and a field DCT mode. For simplicity, however, the transcoder of the present invention does not use the field DCT mode of MPEG-2. In the transcoder of the present invention, all MPEG-2 DCT blocks use the 88 DCT mode. Therefore, a conversion to the 88 DCT mode is performed in the exemplary embodiment of the invention when a 248-DCT block is encountered in the DV bit-stream. The process for converting from 248 DCT blocks to 88 DCT blocks is described below in section III.

(3) Even for the 88 DCT mode in DV, which has exactly the same coefficient order as the frame DCT in MPEG-2, it is not possible to directly use the quantized DCT coefficients in the DV, due to the difference in the quantization processes between the two standards. The MPEG-2 quantization-weighting matrix is chosen on a picture-by-picture basis and a quantization scale is chosen on a macroblock-by-macroblock basis. The DV quantization method, described above is more complex. Accordingly, it is impossible to simply choose an appropriate MPEG-2 weighting matrix that would allow the direct reuse of the quantized DV DCT coefficients by simply adjusting the weighting scale for each macroblock. Even if the weighting matrices in DV did have a simple scaling relationship with that in MPEG-2, it would still not be possible to reuse the DV coefficients directly in MPEG-2. The weighting scale in MPEG-2 is chosen at the level of one macroblock (8 DCT blocks) whereas the corresponding quantization decisions (class number and quantization table number) are made at the level of each DCT block in DV. Accordingly, in the exemplary embodiments of the invention, the DCT coefficients are requantized.

Complete dequantization and requantization is not necessary, however. If an MPEG-2 weighting matrix is specified to match the 88 area numbers, shown in FIG. 3 with quantization steps taken from the first row of the DV quantization table, (Table 1, the finest quantization step), then the DCT coefficients can be reused simply by doing some bit shifting on the original quantized DV DCT coefficients. This is possible because the quantization steps in DV are always powers of 2 times the finest quantization steps. In addition, because both MPEG-2 and DV use the same zigzag scan order for 88 DCT and because MPEG-2 and DV both use run-length coding, the run-lengths can be reused. In those cases when a quantization step size other than the finest step size for DV is used within the MPEG stream, some non-zero DCT coefficients of DV may become zero in MPEG. In this instance, some extra processing may be used to combine two or more run-lengths into one.

Software Transcoder

Figure 6:
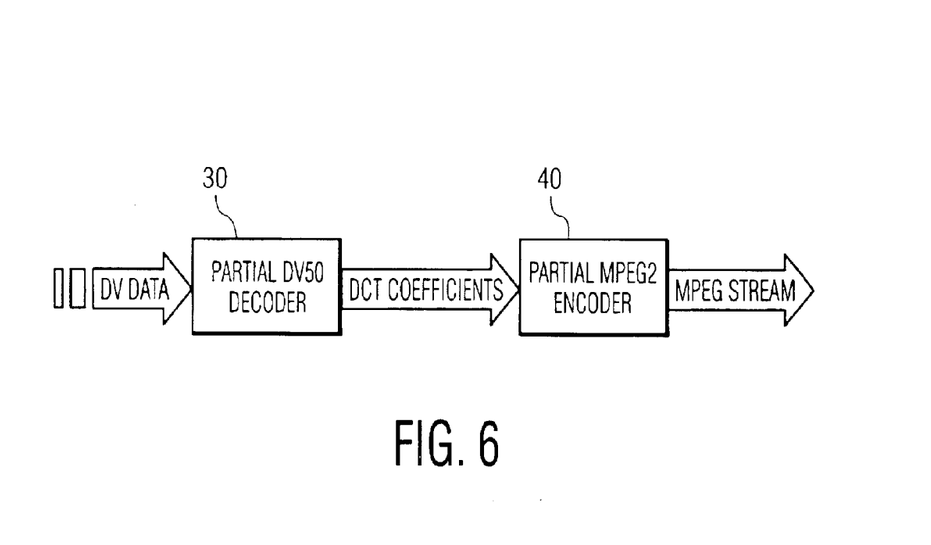
FIG. 6 is a block diagram of a transcoding system in accordance with the present invention.

FIG. 6 illustrates a general block diagram of a software transcoder in accordance with the present invention. The transcoder includes a decoder module 30 and an encoder module 40. The de coder module 30 takes frames of DV data as input data and produces raw DCT coefficients as output data. The encoder module 40 requantizes the DV DCT coefficients to MPEG-2 DCT coefficients and encodes the coefficients as MPEG-2 data. While the transcoder is described herein as software based, hardware adaptation of the same is within the skill of those in the art. The transcoder employs the following simplified procedure:

Decode the (run-length, quantized-DCT) combinations in DV to obtain at least partially dequantized, run-length coded coefficients Requantize the dequantized-DCT coefficients Format the DCT coefficients into sequences of image frames Encode the re-quantized-DCT coefficients with the MPEG-2 VLC table into an MPEG-2 bit-stream.

The run-length computation in MPEG-2 can be omitted, at least for 88 DV blocks, by reusing the run-length values from the DV blocks. As described below, these values can be reused if the MPEG quantization matrix is defined to correspond to the first row of the DV quantization table. With an MPEG-2 weighting matrix corresponding to the coarser quantization steps in DV and some minor modifications on the process described above, the bit-rate and quality of the output MPEG-2 stream can be adjusted. In the exemplary embodiment of the invention, partial dequantization and requantization is used only when converting 88 format blocks in DV to MPEG transcoding. As described below in section III, 248 DCT blocks are fully dequantized and requantized as a part of the conversion process.

I. Transcoding from DV to MPEG-2 4:2:2 (I-Frames only)

Based on the discussion above, two algorithmic simplifications are incorporated in the transcoder of the present invention. First, due to the essential equivalence between the DCTs in the two standards, the step of doing an inverse DCT (IDCT) can be avoided. In other words, the DCT coefficients may be reused without converting data to the pixel level. This eliminates the computation intensive steps of doing an IDCT and then a second DCT. As the DCT with rounding is one source of losses in the encoding process, the exemplary transcoding process is less lossy than a process that fully decodes the DV data into pixels and then encodes the pixels as MPEG-2 images. Second, as noted above, inverse quantization and re-quantization are not always necessary. For 88 DCT blocks, the quantized DCT coefficients may be used directly.

Figure 7:
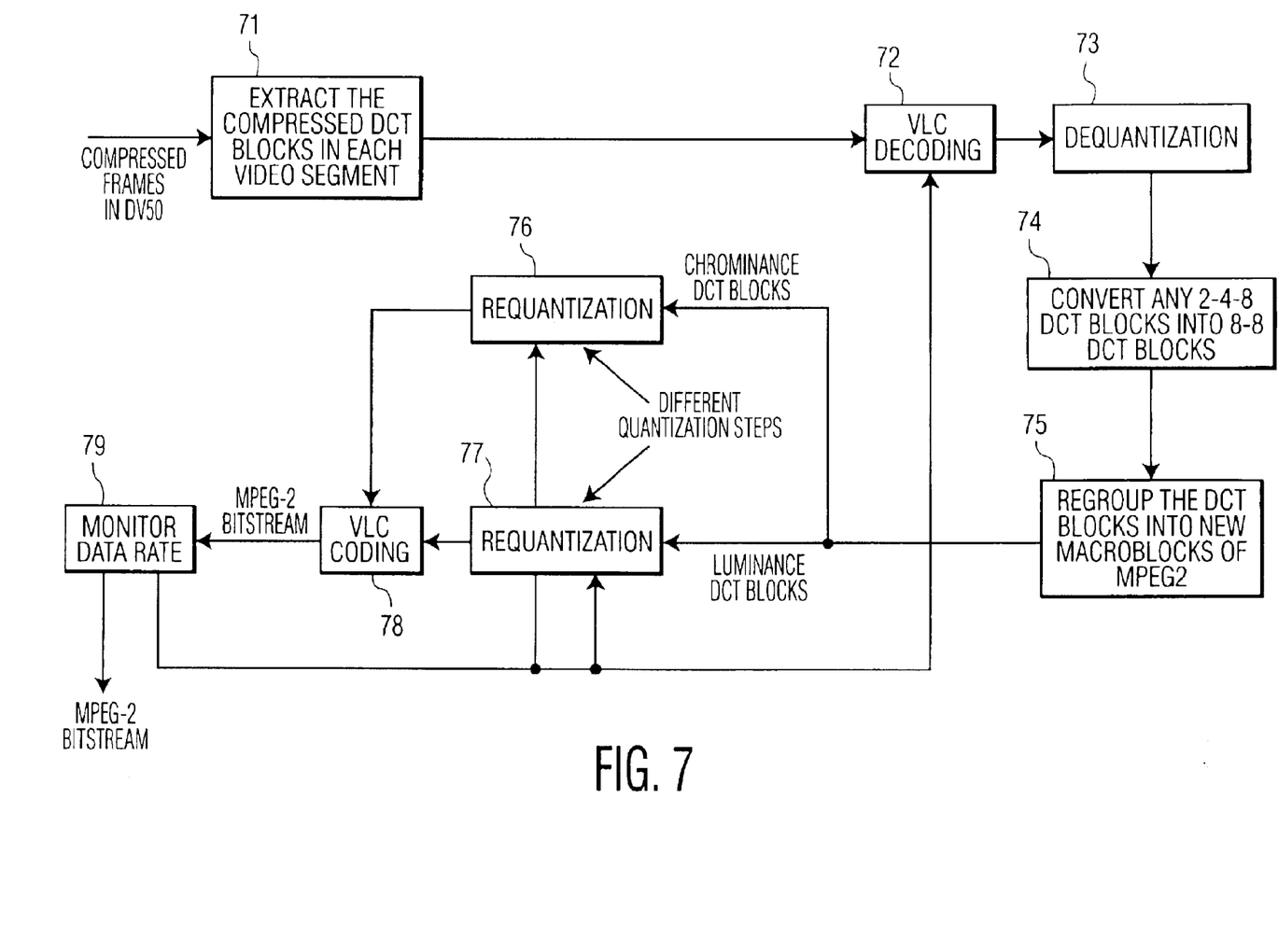
FIG. 7 is a general flow diagram of the transcoding system of FIG. 6.

The method of transcoding from DV to MPEG-2 can be divided into two general phases shown in FIG. 7: (A) partial decoding and (B) partial encoding. Briefly, In step 71 of FIG. 7, the compressed DCT blocks are extracted from the DV segments. At step 72, the DCT coefficients are variable-length decoded and dequantized at step 73. At step 74, any 248 DCT blocks are converted into 88 DCT blocks and at step 75, the decoded and dequantized DV DCT blocks are regrouped into DCT blocks and macroblocks for the MPEG signal. At steps 76 and 77, the regrouped coefficients are quantized and at step 78, the quantized coefficients are variable-length coded to produce the output bit-stream. At step 79, the data rate of the MPEG bitstream is monitored to generate a data rate control signal. This signal is applied to steps 72, 76 and 77. In step 72, the signal controls how the DV overflow data is decoded from the DV blocks and, thus, how this data is used to generate MPEG blocks. In steps 76 and 77, the signal controls the MPEG quantization scale factor that is used for respective macroblocks of the MPEG signal.

The smallest unit where there is a logical correspondence between the DV and MPEG data is one frame. In DV each frame is encoded independently of others. Only the I-frame mode in the MPEG-2 format, is used to simplify implementation and to retain the editing capabilities of DV. The basic transcoding process, therefore, consists of decoding each DV frame partially, i.e. down to DCT coefficients, and then re-encoding the frames into MPEG-2 I-frames.

Partial decoding generally includes:
(1) Collecting overflow data.
(2) VLC decoding of the DV stream.
(3) Converting 248 DCT blocks in DV into 88 DCT blocks.

In partial decoding, instead of reconstructing the pixels of the video frame, corresponding DCT coefficients are extracted in step 71 and VLC run lengths are extracted in step 72. In the encoding phase steps 73–78, the extracted DCT coefficients are re-encoded into the MPEG-2 format described in greater detail below with reference to FIG. 9.

Figure 8:
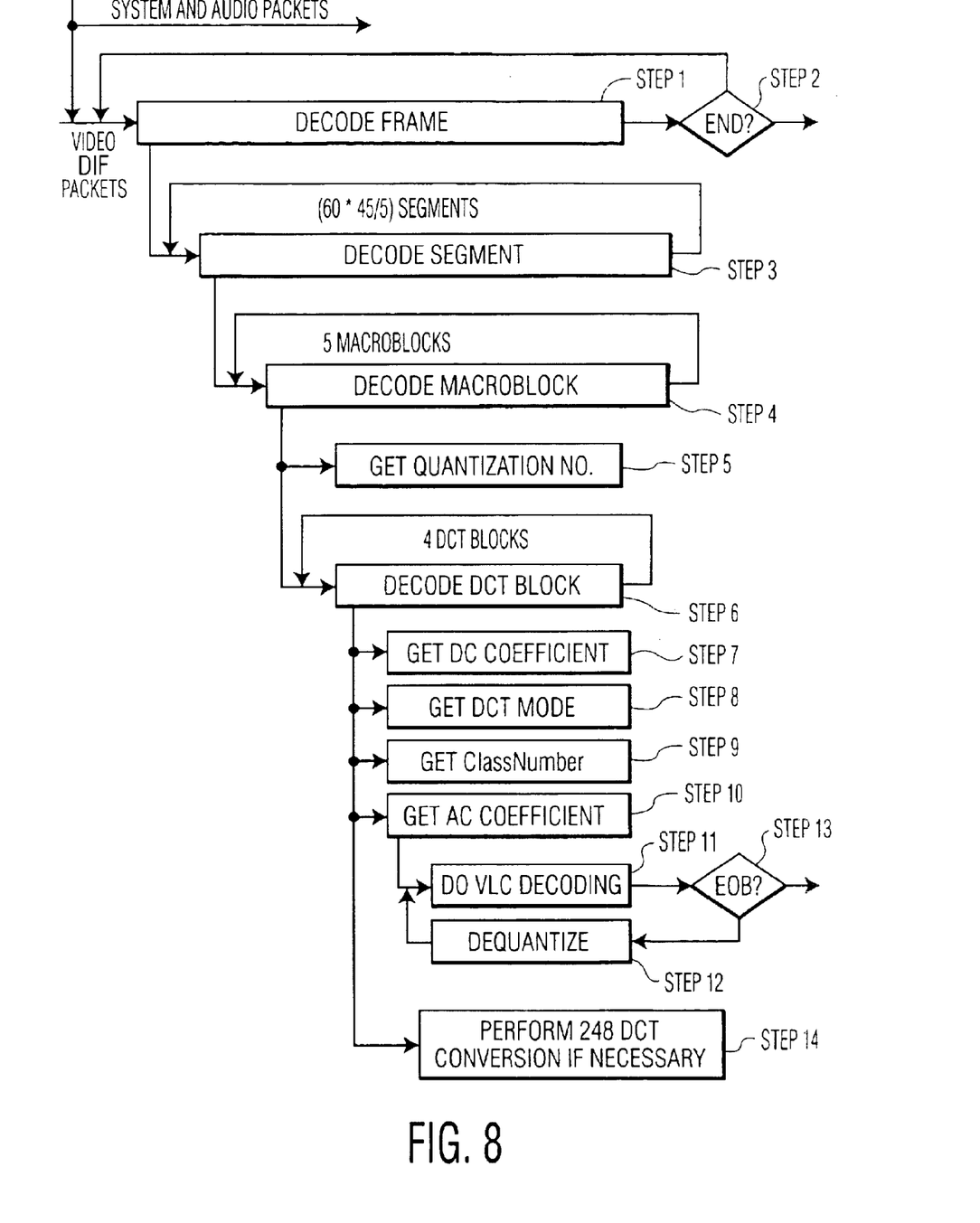
FIG. 8 is a hierarchical flow diagram of the decoding process of the transcoding system of FIG. 6.

In FIG. 8, the partial decoding process is shown more specifically as a hierarchical flow diagram. In a flow diagram of this type, some blocks are indented with respect to other blocks. The top-most block represents the entire operation. Sub-blocks that are indented from this block represent steps that are performed to complete the operation. Each of these sub-blocks, in turn may have further indented sub-blocks representing steps that are performed to complete the sub-block operation.

Figure 9:
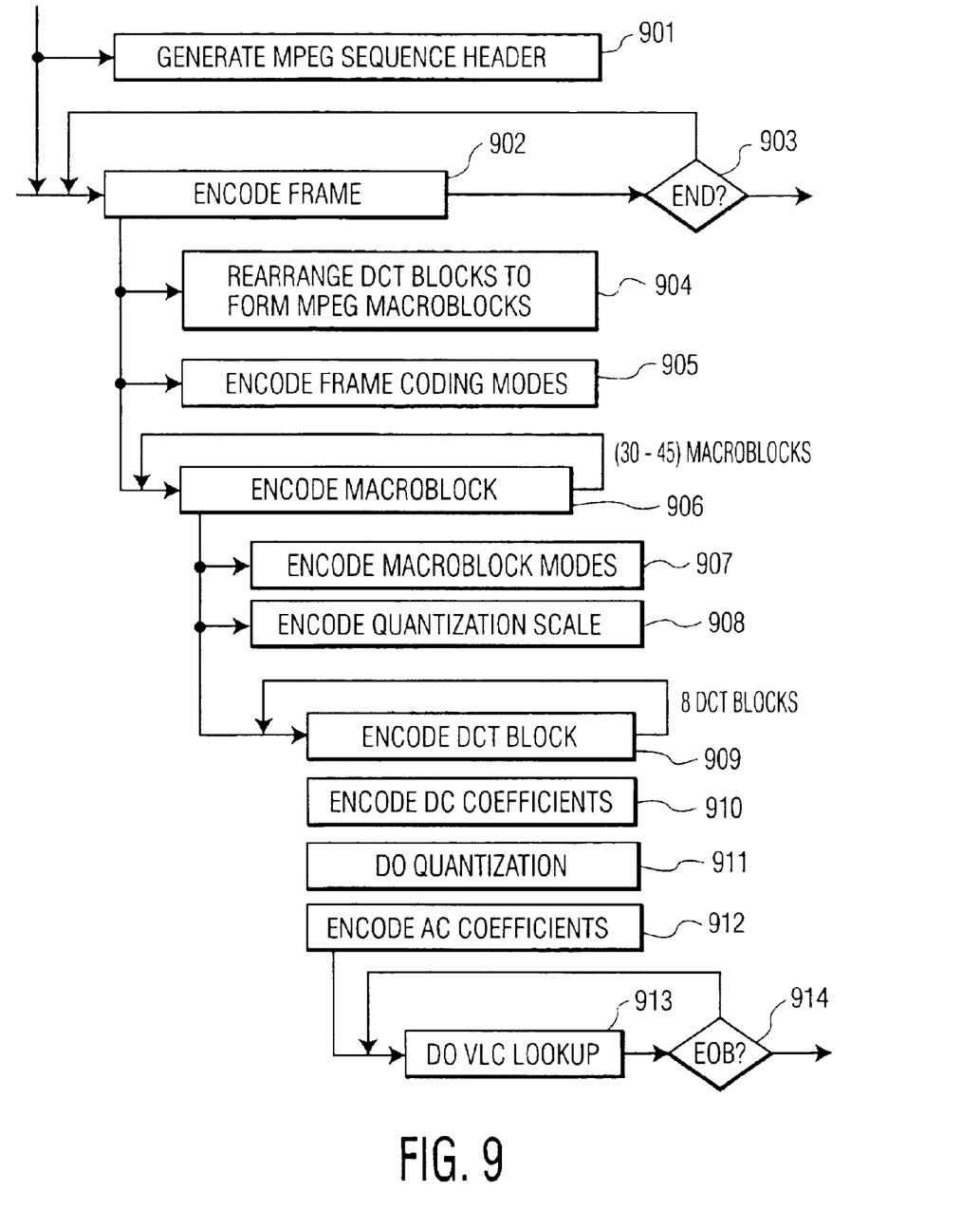
FIG. 9 is a hierarchical flow diagram of the encoding process of the transcoding system of FIG. 6.

At step 801 of the hierarchical flow diagram shown in FIG. 9, a series of video frames, encoded as DIF packets, is received and separated into segments and decoded. Step 801 repeats for each video frame until the end of the video sequence is detected at step 802. The segments, in turn, are decoded at step 803. Each segment includes five macroblocks. Accordingly, at step 804, the individual macroblocks of the segments are decoded. At this step, any overflow bits that are distributed among the blocks of the macroblock and among the macroblocks of the segment are retrieved and stored separately. At step 805, macroblock decoding process determines the quantization step sizes that are used for each block. In step 806–813, the individual blocks of DCT coefficients are processed. At steps 806–810 the variable-length DCT coefficients are extracted from the blocks and the DCT mode of the block, 88 of 248, is identified. Also at steps 806–810, the overflow bits are processed to recover the corresponding coefficient values and these values are restored to their respective blocks. At steps 811, 812 and 813, the extracted coefficients are variable-length decoded and at least partially dequantized, as described above. If a block is in 248 mode then, at step 814, it is converted to an 88 block, as described below in section III. When a block is converted from a 248 mode block to an 88 mode block, the 248 block is fully dequantized. The result of the process shown in FIG. 8 is a stream of DCT coefficients that are at least partially dequantized. These coefficients, however, if they are derived from 88 DV blocks, are still run-length coded and in the zigzag scan order used for the 88 block format.

As described above, coefficients in 248 DV blocks are fully dequantized during the transcoding process. Coefficients in 88 format DV blocks may also be fully dequantized. In either of these operations the DV coefficients are fully is dequantized using an approximation of the dequantization operation. Essentially, the quantization process involves multiplying each DCT coefficient by a (floating point) weighting factor, and then scaling it by the corresponding quantization-step. Because all the quantization steps are powers of 2, the division can be simply carried out by means of bit shifting. A rounding process is incorporated to achieve smaller quantization errors. The processes of quantizing with rounding and dequantizing are shown in equations (2).

Quantization: $QDCT = (DCTCoeff * WFactor + Sign(DCTCoeff)*Quanstep)/Quanstep$, where $Sign(x) = \{1$ if $x>0; 0$ if $x=0; -1$ if $x<0\}$ Dequantization: $DCTCoeff = QDCT/WFactor*Quanstep$, (2)

where QDCT is the quantized DCT coefficient, Wfactor is the weighting factor and Quanstep is the quantization step. Thus a floating-point division operation is performed as part of the dequantization operation. The implementation of the exemplary embodiment of the invention approximates the operations of equation (2) by equation (3).

$DCTCoeff = ((QDCT*IntFactor)*Quanstep)>>15;$ (3)

where $IntFactor = \lfloor 32768/WFactor \rfloor$ and ">>15" means to shift to less significant bit positions by 15 bits.

Although this exemplary embodiment of the invention fully de-quantizes the coefficients using an approximation to the full dequantization algorithm, it is contemplated that the coefficients may be only partially dequantized as described above.

Preferably, a simple, optimal procedure to implement the VLC decoding is provided in step 13. Ideally this would achieve the YLC lookup in as little as 2 CPU cycles. A pre-stored lookup table is used to achieve a tradeoff between memory and efficiency. Since the length of the VLC codeword is not known in advance but only that it has a maximum length of 16 bits, the loon up table returns the correct code-word for any arbitrary input stream; in this exemplary embodiment of the invention, a table of size 216 is used. Using this table, the VLC decoding becomes a simple table lookup operation, which may be simplified further using a native hardware implementation on PENTIUM® CPUs manufactured by Intel Corporation.

II. MPEG Bit-Rate Control Via DV Decoding Level

The exemplary decoder described above processes the overflow bits both from the segments and from the individual macroblocks. It is contemplated, however, that to control the bit-rate of the encoded MPEG-2 signal, the partial decoding process may ignore the overflow bits that are associated with the segments or with both the segments and the macroblocks. In ignoring the overflow bits, the exemplary process selectively sets the coefficient values corresponding to the overflow bits to zero. In order to understand how the overflow bits are processed during conversion, it is helpful to understand how the overflow bits are generated during the initial encoding operation. The method of distributing the overflow blocks among the macroblocks and among the segments is described below.

There are three levels of bit rate distribution in a DV segment:

1) The bits for each DCT block are distributed into the assigned space for the block ($1^{st}$ level).
2) The overflow bits of the DCT blocks are concatenated within the same macroblock and distributed to the unused space of the other DCT blocks of the macroblock. ($2^{nd}$ level)
3) If after the second level there are still overflow bits for some macroblocks in a segment, then these bits are concatenated and distributed to unused space of the DCT blocks of the same segment. ($3^{d}$ level)

Because the blocks are run-length coded and variable length coded, each coefficient in each block is specified. The blocks of the segment are encoded in a predetermined order, storing the coefficients that do not fit into the data space allocated for a particular block into a list. If, after encoding a macroblock, coefficients for that macroblock are in the overflow list, the encoding method first tries to place these coefficients into available space in any of the blocks of the same macroblock in a predetermined order. If space can not be found, these coefficients are then stored in the overflow list for the segment. After the segment has been encoded, these coefficients are stored into available locations in the remaining macroblocks in a predetermined order.

The overflow bits can be recovered by reversing the process. As each block is decoded, any extra data in the block is identified as overflow data. When a decoded block does not include all of its coefficients, the process first looks to extra data in the same macroblock to recover the coefficients. Any overflow data remaining after the macroblock has been completely decoded is segment overflow data. Once all of the macroblocks in the segment have been processed in this manner, the process then decodes the remaining missing coefficients from the segment overflow data.

Thus, in transcoding the DV stream into the MPEG stream the bit rate of the MPEG stream can be controlled both by adjusting the quantization scale and by selecting which overflow bits are decoded. Three options are available, corresponding to the three levels of handling overflow bits.

1) Decode only the bits in the assigned space for each DCT block. This method produces the lowest bit rate and the lowest data quality.

2) in addition to (a), decode the overflow bits within each macroblock, namely the bits distributed in the $2^{nd}$ level. This will yield a higher data quality and bit-rate in the MPEG steam.

3) Decode all the DV bits in the blocks and all of the overflow bits.

This method produces the highest quality and highest bit rate.

III. 248 to 88 DCT Conversion

Figure 2:
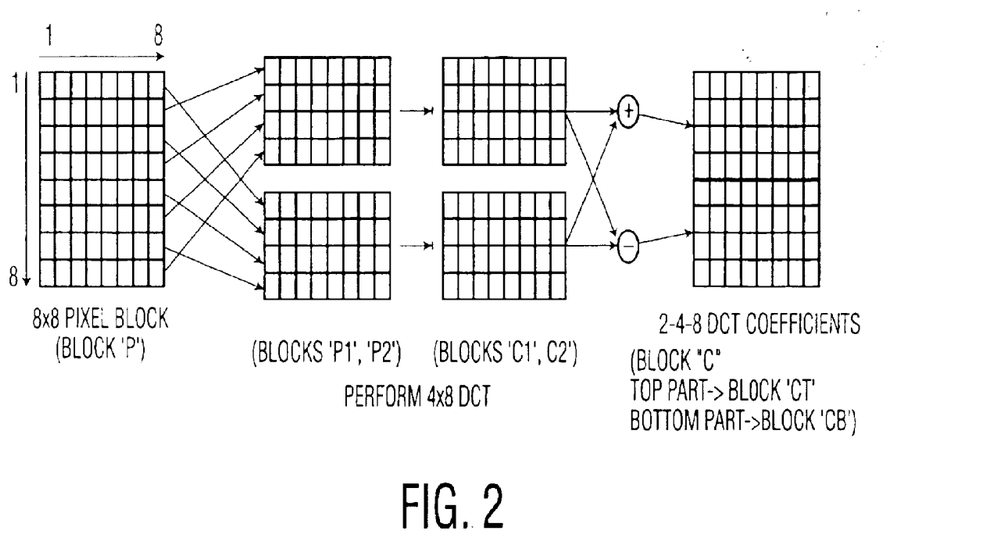
FIG. 2 is an exemplary pixel block diagram which is useful for describing the relationship between a 248 DCT block and an 88 DCT block.

FIG. 2 illustrates the relationship between a block of pixels (Block 'P') and to a block (Block 'C') of 248-DCT coefficients. Alternate rows of pixels are regrouped into two sub-blocks, $P_1$ and $P_2$, the blocks $P_1$ and $P_2$ are subject to a 4×8 DCT to provide blocks of coefficients, $C_1$ and $C_2$. These two blocks are then recombined to give the final block of 248-DCT coefficients. Mathematically, the operation of converting from a block of 248 format DCT coefficients to a block of 88 DCT coefficients is derived as follows:

1) Obtain $C_1$ and $C_2$ from block C using equations (4):

$$C_1 = \frac{C_T + C_B}{2a} + H; \quad C_2 = \frac{C_T - C_B}{2a} + H \quad (4)$$

where $$a = \frac{1024}{2 * 724}$$

is a scaling factor and H is a constant matrix, which compensates forte fixed DC offset, CT is the matrix of coefficients from the top block and CB is the matrix of coefficients from the bottom part of the shown in FIG. 2.

2) Compute $P_1$ and $P_2$ by doing inverse 4×8 DCT according to equation (5):

$$P_1 = T_4^T C_1 T_8; P_2 = T_4^T C_2 T_8 \quad (5)$$

where $T_4$ and $T_8$ are the 4-point and 8-point DCT transformation matrices respectively.

3) Compute P, by shuffling the rows of $P_1$ and $P_2$ according to equation (6):

$$P = A_1 P_1 + A_2 P_2 \quad (6)$$

where $A_1$ and $A_2$ are the matrices that represent a shuffling operation, for example.

$$A_1 = \begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix} \quad A_2 = \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix}$$

4) Finally, perform regular DCT on the pixel block P to get the 88-DCT block, C' according to equation (7):

$$C^T = T_8 P T_8^T \quad (7)$$

The following summarizes the above steps.

$$\begin{aligned} C^T &= T_8 P T_8^T \\ &= T_8(A_1 P_1 + A_2 P_2) T_8^T \\ &= T_8(A_1 T_4^T C_1 T_8 + A_2 T_4^T C_2 T_8) T_8^T \\ &= \left(\frac{F_1 + F_2}{2a}\right) C_T + \left(\frac{F_1 - F_2}{2a}\right) C_B + (F_1 + F_2) H \\ &= FC + K \end{aligned} \quad (8)$$

where $$F_1 = T_8 A_1 T_4^T; \quad F_2 = T_8 A_2 T_4^T$$

$$F = \left(\frac{F_1 + F_2}{2a} \quad \frac{F_1 - F_2}{2a}\right)$$

$$C = \begin{pmatrix} C_T \\ C_B \end{pmatrix}$$

$$K = (F_1 + F_2) H$$

In the last step above, $C_T$ and $C_B$ are combined into a single matrix C; F and K are constant matrices derived from $F_1$, $F_2$ and H as shown.

As shown in Equation (8), this operation of converting from a block of coefficients $C_{248}$ in 248 format to a block of coefficients $C_{88}$ in 88 format can be mathematically reduced to equation (9):

$$C_{88} = F C_{248} + K \quad (9)$$

First the matrix F is pre-computed and then approximated by an integer array to an accuracy of about 4 decimal digits. This matrix is very sparse, i.e., only a small fraction of its coefficients are non-zero. Also, the matrix K has only the DC coefficient non-zero. Therefore, the operation described by equation (9) can be reduced to a hard-coded multiplication by the non-zero coefficients of the F matrix, and addition of the DC coefficient of the K matrix.

IV. Conversion of the Decoded DV Coefficients to MPEG-2 4:2:2 Profile@Main Level FIG. 9 is a hierarchical flow diagram that shows details of the MPEG-2 encoding process. This module produces an MPEG-2 video stream from a block of dequantized (or at least partially dequantized) DCT coefficients.

In step 901 the data stream is identified with an MPEG-2 sequence header and then, at step 902, each image frame is identified by an MPEG picture header. The process of encoding a video frame includes steps 902–914, as described below. The encoding of video frames continues until, at step 903, no more video frames are to be encoded.

In step 904 the DCT blocks that resulted from partially decoding the DV signal are arranged to form slices of MPEG macroblocks, each with a slice header. In the exemplary embodiment, all frames are encoded as MPEG-2 intra-frame coded data (I-frames). Accordingly, at step 905, the frame is marked as being an I frame. In steps 906–914, the individual macroblocks are encoded using the blocks that were decoded from the DV signal. In steps 907 and 908, the macroblock header is inserted into the bit stream including a first data value indicating that the macroblock is a frame encoded 4:2:2 macroblock and a second data value indicating an appropriate quantization scale value for the macroblock.

At steps 909–914, the DV blocks are encoded and requantized. At step 910, the DC coefficient is encoded. At step 911, the AC coefficients are quantized according to the quantization table and at steps 912–914 the AC coefficients are variable-length coded. The encoding of an individual block continues until, at step 914, 64 coefficients have been encoded. When this occurs, control transfers to step 909 to encode the next block. When eight blocks have been encoded at step 909, control transfers to step 906 to encode the next macroblock. When a number of macroblocks corresponding to image pixels that extend across the video frame (a slice) have been encoded, control transfers to step 904 to encode the next slice.

In step 912 the DCT coefficients decoded from the DV stream are requantized as DCT coefficients according to the MPEG-2 standard. If the block being encoded was a 248 DV block that was converted to an 88 block, the coefficients are fully dequantized. If, however, the block was originally an 88 block in the DV signal, the coefficients at step 911 may be quantized. DV coefficients.

At step 911, the fully dequantized coefficients (rawCoeff) are quantized in accordance with the MPEG standard into quantized coefficients (QuanDCT) using the MPEG quantization matrix (Qmatrix) and quantization scale values (Qscale) as defined by equation (10):

$$Qstep = Qmatrix[i][i] \times Qscale$$

$$QuanDCT = (16 * rawCoeff + \text{Sign}(rawCoeff) * Qstep/2)/Qstep \quad (10)$$

V. Partial Dequantization and Requantization

As set forth above, rather than fully dequantizing the DV coefficients and then requantizing the MPEG-2 coefficients, the quantized DV coefficients for blocks that we re originally in 88 format may be converted into quantized MPEG-2 coefficients by a simple bit-shifting operations. In this conversion process, the MPEG-2 weighting matrix is selected to correspond to the 88 DCT block number matrix, shown in FIG. 3, with the quantization steps determined from the first row of the DV quantization table (i.e. the finest step size). The quantized DV coefficients may be converted to quantized MPEG-2 coefficients by a simple bit-shift operation on each coefficient. This is possible because the quantization steps in the DV standard are always a power of two times the finest quantization steps.

VI. DCT Mode Selection in DCT Domain (MPEG-2 4:2:2 (I-Frames only to DV))

Transcoding MPEG-2 to DV follows from symmetry but is briefly described below with reference to FIG. 10. In the exemplary embodiment of the invention, the input MPEG data is limited to be intra-frame (I-Frame) coded and having a 4:2:2 chrominance format.

Figure 10:
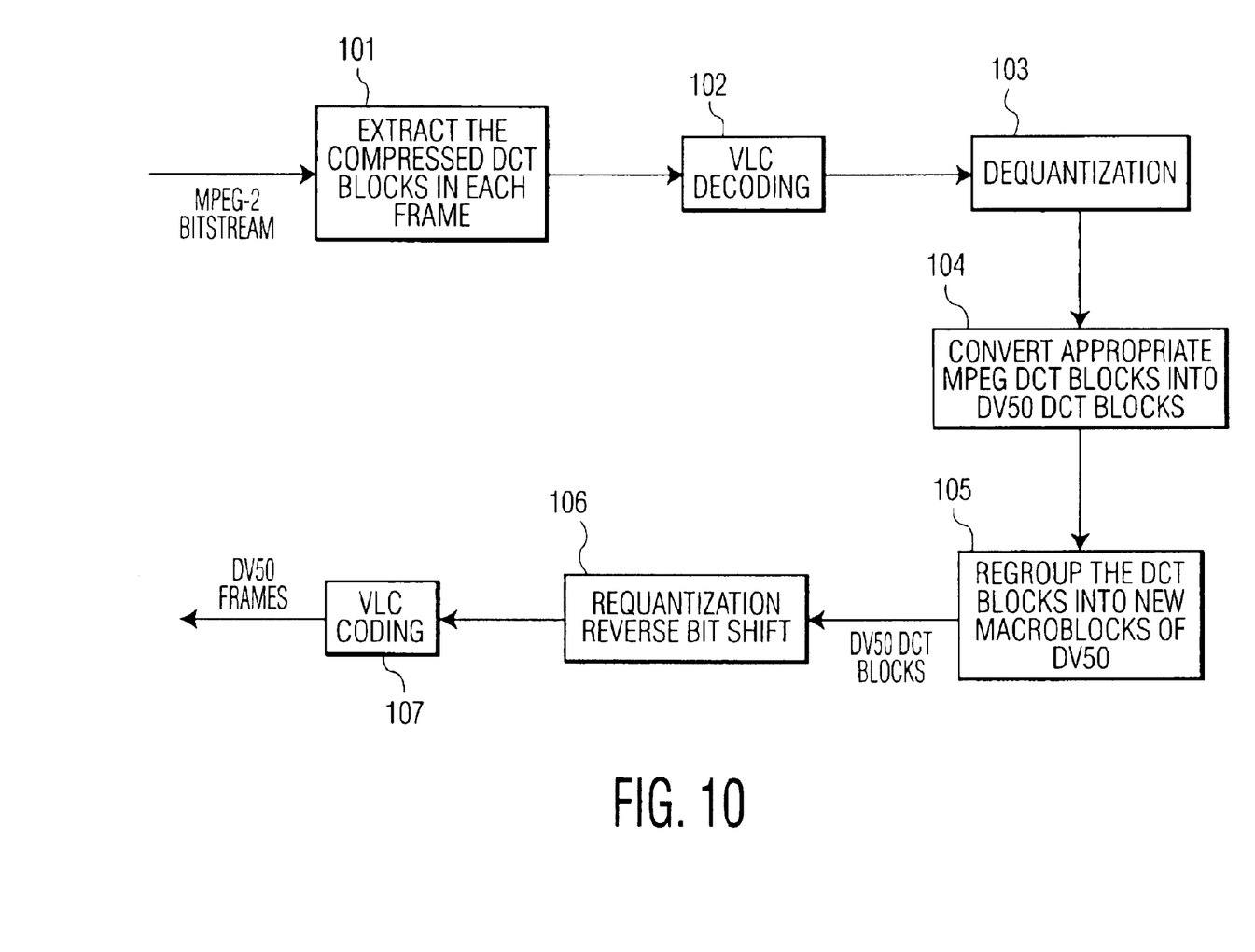
FIG. 10 is a block diagram of an MPEG-2 to DV transcoding system.

FIG. 10 illustrates a general block diagram of a software transcoder in accordance with a further aspect of the present invention. The transcoder takes I-frames of MPEG-2 data as input and produces raw DCT coefficients that are then used to generate the corresponding DV signal: The transcoder re-quantizes the MPEG-2 DCT coefficients to DV DCT coefficients and encodes the coefficients as a DV signal.

As can be appreciated, in partial decoding, instead of reconstructing the pixels of the video frame, corresponding DCT blocks are extracted in step 101, each macroblock of the slice is decoded to extract DCT blocks. In step 102, the coefficients are processed through a variable length decoder and a run-length decoder. In step 103 the quantization step size used for each of the DCT blocks is determined and the coefficients are dequantized. In steps 104, the blocks of MPEG DCT coefficients are converted into blocks of DV coefficients. At step 105, the converted blocks are regrouped into DV macroblocks. At step 106, the DV macroblocks are quantized and, at step 107, the quantized macroblocks are variable-length coded to produce the DV encoded output signal.

In the exemplary embodiment of the invention, the MPEG-2 coefficients are completely dequantized at step 103 and the blocks of coefficients are then requantized according to the DV standard at step 106. In addition, because both MPEG-2 and DV use the same zigzag scan order for 88 DCT and the same run-length coding, the run-lengths and the coefficient order can be reused.

By using only the I-frame mode in the MPEG-2 format, implementation is simplified and the editing facilities remain intact. The basic transcoding process consists of decoding each MPEG-2 frame partially, i.e. down to DCT coefficients, and then re-encoding the coefficients into DV format. Partial decoding generally includes:

(1) VLC decoding of the MPEG-2 stream.
(2) Dequantize the DCT coefficients
(3) Converting MPEG macroblocks into DV macroblocks.

After dequantizing the MPEG frame-mode DCT blocks, it is desirable to determine whether a particular block should be encoded as a 248 DV block. In the exemplary embodiment of the invention, the each frame-mode MPEG block is analyzed to determine if it exhibits significant intra-frame motion. Because there are two DCT modes in DV encoding, (i.e., 88 frame mode and 248 field mode) a significant improvement in both temporal and spatial resolution may be achieved by recognizing MPEG blocks that combine two fields which exhibit significant intra-frame motion and encoding those blocks as 248 blocks in the DV signal.

The criteria for determining whether an MPEG-2 block is a candidate for recoding as a DV 248 block is described below. Assume that a pixel DCT block is denoted as P(x,y) (x,y=0,1 . . . 7) where x is the vertical position y is the horizontal position.

In the pixel domain, the selection of the DCT mode follows from equation (12)

$$\text{Sum} = \sum_{y=0}^{7} \text{abs}\left(\sum_{x=0}^{7} (-1)^x P(x, y)\right) \quad (12)$$

If the Sum≧a predetermined threshold, the 248 DCT mode is selected, otherwise the 88 DCT mode is selected.

When only 88 DCT coefficients are decoded from the MPEG stream, it is undesirable to perform IDCT to recover the pixels and then perform the process described above just to determine whether the block should be coded as a 248 DCT block. Preferably, this analysis and selection should be performed in the DCT domain. For example, a pixel DCT block Q(x,y) is constructed such that:

Q(x,y)=a when x is even where a=threshold/sum, where the threshold=600 and $$a = \frac{600}{32} \; Q(x, y) = 0$$

when x is odd

Using this DCT block, Sum==the predetermined threshold defined in the pixel domain above. Next the 88 DCT is performed on Q(x,y) to get a DCT coefficient DQ(m,n) (m.n=0,1, ... 7). Note that only D(2v+1,0) is not zero (v=0,1,2,3) and DQ(7,0) is significantly greater than its counterparts in those 88 DCT blocks with their mode selected in the pixel domain. Thus, it is reasonable to use the absolute value of DQ(7,0) as an index to make the mode selection decision in the DCT domain.

Therefore, if the 88 DCT coefficient block is denoted D(m,n) m,n=0,1 ... 7, the selection process in the DCT domain is:

If abs(D(7,0))≧DQ(7,0), 248 DCT mode is selected (and the 88 to 248 DCT conversion is performed), otherwise the 88 DCT is selected (i.e., D(m,n) remains intact).

At step 104, the exemplary process examines each decoded MPEG block to determine whether it should be encoded as an 88 or 248 DV block. The method for converting from 88 coefficient blocks to 248 coefficient blocks follows from the process, described above, that is used to convert the 248 blocks to 88 blocks. Equation (13) that describes the conversion of 88 blocks into 248 blocks can be derived from equation (9), $$C_{248}=F^{-1}(C_{88}-K) =F^{-1}C_{88}K_{88} \qquad (13)$$

where $K_{88}=F^{-1}K$. The inventors have determined that $FF^T=$ 1.00021 where I is an 8 by 8 identity matrix. Consequently, $F^{-1} \approx F^T$ and the translation from an 88 block to a 248 block may be approximated by equation (14).

$$C_{248}=F^T C_{88}-F^T K \qquad (14)$$

Thus, the same process that is used to convert the 248 blocks of coefficients into 88 blocks of coefficients may be used to convert 88 blocks of coefficients into 248 blocks of coefficients.

Although the invention has been described in terms of a transcoding process, it is contemplated that the invention may be implemented as computer software embodied in a computer-readable carrier such as a magnetic disk, optical disk, radio-frequency carrier wave or audio-frequency carrier wave.

It will be appreciated by those skilled in the art that changes could be made to the embodiments described above without departing from the broad inventive concept thereof. For example, while the present invention utilizes DV and MPEG-2 formats, those skilled in the art recognize that the method described herein is generally applicable to intra-coded or intra-frame formats. It is underestood, therefore, that this invention is not limited to the particular embodiments disclosed, but is intended to cover modifications within the spirit and scope of the present invention.

What is claimed:

1. A method of transcoding a first encoded video signal that has been compressed using a discrete cosine transform (DCT) operation in a first video format into a second encoded video signal that is compressed using a DCT operation in a second video format, different from the first video format, the method comprising:

decoding the first encoded video signal to obtain a stream of DCT coefficient blocks in the first format wherein at least some of the DCT coefficient blocks include run-length coded coefficient values;

reformatting the DCT coefficient blocks obtained from the first encoded video signal into DCT coefficient blocks for the second format without run-length decoding the run-length coded values; and encoding the second-format DCT coefficient blocks to obtain the second encoded video signal.

2. A method according to claim 1, wherein a plurality of the DCT coefficient blocks of the first encoded video signal include a plurality of coefficients ordered according to a zigzag scan and the step of reformatting the DCT coefficient blocks obtained from the first encoded video signal into DCT coefficient blocks in the second format includes the step of preserving the zigzag scan order of the plurality of coefficients for a respective plurality of blocks of DCT coefficients in the second format.

3. A method of transcoding a first encoded video signal that has been compressed using a discrete cosine transform (DCT) operation in a first video format into a second encoded video signal that is compressed using a DCT operation In a second video format, different from the first video format, wherein the first video signal is encoded according to a digital video (DV) standard having a quantization table defining varying quantization step sizes and the second video signal is encoded according to a moving pictures expert group (MPEG) standard having a quantization matrix the method comprising:

decoding the first encoded video signal to obtain a stream of OCT coefficient blocks in the first format wherein at least some of the DCT coefficient blocks include run-length coded coefficient values;

reformatting the DCT coefficient blocks obtained from the first encoded video signal into DCT coefficient blocks for the second format without run-length decoding the run-length coded values, wherein the step of reformatting the DCT coefficient blocks obtained from the DV video signal into DCT coefficient blocks for the MPEG video signal includes the steps of:

setting the MPEG quantization matrix to correspond to a finest quantization step size in the DV quantization table; and multiplying quantized DCT coefficients from the DV video signal by respective factors to generate respective quantized DCT coefficients for the MPEG video signal; and encoding the second-format DCT coefficient blocks to obtain the second encoded video signal.

4. A method according to claim 3, where in the respective factors are respective powers of two and the step of multiplying the quantized DCT coefficients by the respective factors includes the step of shifting each DCT coefficient by a number of bit positions corresponding to the respective power of two.

5. A method according to claim 1 wherein:

the first video signal is encoded according to a digital video (DV) standard and the second video signal is encoded according to a moving pictures expert group (MPEG) standard;

the DCT blocks of the DV signal are encoded in one of a 248 format and a 88 format and the method further includes the step of reformatting the 248 format DV blocks into 88 format DV blocks, according to the equation:

$$C_{88}=FC_{248}+k$$

where $C_{88}$ is the block of 88 format DV coefficients, $C_{248}$ is the block of 248 DV coefficients, F a vector defined by the equation:

$$F = \left(\frac{F_1 + F_2}{2a} \frac{F_1 - F_2}{2a}\right)$$

where a=1024/1448, $F_1=T_8A_1T_4^T$, $F_2=T_8A_2T_4^T$, $T_8$ is the 8 point DCT transformation, $T_4$ is the 4 point DCT transformation matrix, $A_1$ and $A_2$ are matrixes:

$$A_1 = \begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix} A_2 = \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix}, \text{and}$$

$$K = (F_1 + F_2)H$$

where H is a constant matrix that compensates for a fixed DC offset between the DV coefficients and the MPEG-2 coefficients.

6. A method for converting a 248 block of DV coefficients into an 88 block of DV coefficients comprising the steps of:

Generating an F vector according to the equation:

$$F = \left(\frac{F_1 + F_2}{2a} \frac{F_1 - F_2}{2a}\right)$$

where a=1024/1448, $F_1=T_8A_1T_4^T$, $F_2=T_8A_2T_4^T$, $T_8$ is the 8 point DCT transformation, $T_4$ is the 4 point DCT transformation matrix, $A_1$ and $A_2$ are matrixes:

$$A_1 = \begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix} A_2 = \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix};$$

Generating a K matrix according to the equation:

$$K=(F_1+F_2)H$$

where H is a constant matrix that compensates for a fixed DC offset between the DV coefficients and the MPEG-2 coefficients; and generating a matrix of 88 DCT coefficients, $C_{88}$, from a matrix of 248 DCT coefficients, $C_{248}$, according to the equation:

$$C_{88}=FC_{248}+K.$$

7. A method for converting an 88 block of DV coefficients into a 248 block of DV coefficients comprising the steps of:

Generating an F vector according to the equation:

$$F = \left(\frac{F_1 + F_2}{2a} \frac{F_1 - F_2}{2a}\right)$$

where a=1024/1448, $F_1=T_8A_1T_4^T$, $F_2=T_8A_2T_4^T$, $T_8$ is the 8 point DCT transformation, $T_4$ is the 4 point DCT transformation matrix, $A_1$ and $A_2$ are matrixes:

$$A_1 = \begin{bmatrix} 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \\ 0 & 0 & 0 & 0 \end{bmatrix} A_2 = \begin{bmatrix} 0 & 0 & 0 & 0 \\ 1 & 0 & 0 & 0 \\ 0 & 0 & 0 & 0 \\ 0 & 1 & 0 & 0 \\ 0 & 0 & 0 & 0 \\ 0 & 0 & 1 & 0 \\ 0 & 0 & 0 & 0 \\ 0 & 0 & 0 & 1 \end{bmatrix};$$

Generating a K matrix according to the equation:

$$K=(F_1+F_2)H$$

where H Is a constant matrix that compensates for a fixed DC offset between the DV coefficients and the MPEG-2 coefficients; and generating a matrix of 248 DCT coefficients, $C_{248}$, from a matrix of 88 DCT coefficients, $C_{88}$, according to the equation:

$$C_{248}=F^TC_{88}-F^TK.$$

8. A computer-readable carrier including computer program instructions, the computer program instructions causing a general purpose computer to perform a method of transcoding a first encoded video signal that has been compressed using a discrete cosine transform (DCT) operation in a first video format into a second encoded video signal that is compressed using a DCT operation in a second video format, different from the first video format, the method comprising:

decoding the first encoded video signal to obtain a stream of DCT coefficient blocks in the first format, wherein at least some of the DCT coefficient blocks include run-length encoded DCT coefficient values;

reformatting the DCT coefficient blocks obtained from the first encoded video signal into DCT coefficient blocks for the second format without run-length decoding the run-length encoded DCT coefficient values; and encoding the second-format DCT coefficient blocks to obtain the second encoded video signal.

9. A computer-readable carrier including computer program instructions, the computer program instructions causing a general purpose computer to perform a method for converting a 248 block of DV coefficients into a 88 block of DV coefficients, the method comprising the steps of:

Generating an F vector according to the equation:

$$F = \left(\frac{F_1 + F_2}{2a} \frac{F_1 - F_2}{2a}\right)$$

where a=1024/1448, $F_1=T_8A_1T_4^T$, $F_2=T_8A_2T_4^T$, $T_8$ is the 8 point DCT transformation, $T_4$ is the 4 point DCT transformation matrix, $A_1$ and $A_2$ are matrixes that represent respective zigzag scan operations of 88 DCT and 248 DCT blocks;

Generating a K matrix according to the equation:

$$K=(F_1+F_2)H$$

where H is a constant matrix that compensates for a fixed DC offset between the DV coefficients and the MPEG-2 coefficients; and generating a matrix of 88 DCT coefficients, $C_{88}$, from a matrix of 248 DCT coefficients, $C_{248}$, according to the equation:

$$C_{88}=FC_{248}+K.$$

10. A computer-readable carrier including computer program instructions, the computer program instructions causing a general purpose computer to perform a method for converting an 88 block of DV coefficients into a 248 block of DV coefficients, the method comprising the steps of:

Generating an F vector according to the equation:

$$F = \left(\frac{F_1+F_2}{2a} \quad \frac{F_1-F_2}{2a}\right)$$

where a=1024/1448, $F_1=T_8A_1T_4^T$, $F_2=T_8A_2T_4^T$, $T_8$ is the 8 point DCT transformation, $T_4$ is the 4 point DCT transformation matrix, $A_1$ and $A_2$ are matrixes that represent respective zigzag scan operations of the 88 DCT and 248 DCT blocks;

Generating a K matrix according to the equation:

$$K=(F_1+F_2)H$$

where H is a constant matrix that compensates for a fixed DC offset between the DV coefficients and the MPEG-2 coefficients; and generating a matrix of 248 DCT coefficients, $C_{248}$, from a matrix of 88 DCT coefficients, $C_{88}$, according to the equation:

$$C_{248}=F^TC_{88}-F^TK.$$

11. A method of transcoding a first encoded video signal that has been encoded according to a digital video (DV) standard Into a second encoded video signal encoded according to a moving pictures expert group (MPEG) standard, wherein the first encoded video signal has segments of macroblocks, each macroblock including a plurality of blocks having a fixed block size of discrete cosine transform (DCT) coefficients, wherein at least one block of DCT coefficients includes data in excess of that which can be accommodated by the fixed-length block size, and the excess data is identified as overflow coefficient data and is stored in one of a) unused space in other blocks of the macroblock that includes the at least one block and b) unused space in other macroblocks of the segment including the at least one block, the method comprising the steps of:

decoding the first encoded video signal to obtain a stream of macroblocks of DCT coefficient blocks In the DV format, a plurality of lists of overflow macroblock coefficients and a list of overflow segment coefficients;

reformatting the DCT coefficient blocks obtained from the first encoded video signal into DCT coefficient blocks for the MPEG format including the step of, responsive to a data rate control signal for the second signal, selectively setting to zero one of a) the coefficients in the plurality of lists of overflow macroblock coefficients and b) coefficients in the list of overflow segment coefficients to control a data rate of the second signal;

encoding the MPEG-format DCT coefficient blocks to obtain the second encoded video signal; and monitoring the data rate of the second signal to generate the data rate control signal.

12. A method according to claim 11, wherein the step of reformatting the DCT coefficient blocks obtained from the DV encoded video signal into DCT coefficient blocks for the MPEG format includes the steps of:

setting to zero only the coefficients in the list of overflow segment coefficients responsive to the data rate control signal having a first value; and setting to zero both the coefficients in the list of overflow segment coefficients and the coefficients In the plurality of lists of overflow macroblock coefficients responsive to the data rate control signal having a second value, different from the first value.

13. A method according to claim 12, wherein:

the step of encoding the MPEG format DCT coefficient blocks to obtain the second encoded video signal includes the step of quantizing the MPEG format DCT coefficient blocks according to a quantization scale factor to produce output data representing quantized coefficient values; and the step of reformatting the DCT coefficient blocks obtained from the DV encoded video signal into DCT coefficient blocks for the MPEG format includes the step of adjusting the quantization scale factor to reduce the output data of the MPEG encoding step in number of bits.

14. A method according to claim 1, wherein the first video signal is encoded according to a moving picture experts group (MPEG) standard having only intra-frame encoded frames and having all macroblocks in a 4:2:2 chrominance format with 88 blocks of encoded DCT coefficients, and the second video signal is encoded according to a digital video (DV) standard.

15. A method according to claim 14, further including the steps of:

determining whether each MPEG coefficient block represents significant intra-frame motion; and if it is determined that one of the MPEG coefficient blocks represents significant intra-frame motion, converting the one MPEG coefficient block from 88 format to 248 format before encoding the coefficient block to obtain the DV encoded video signal.

* * * * *